United States Patent
Shoupp et al.

[11] 3,709,118
[45] Jan. 9, 1973

[54] INTEGRAL MECHANICALLY ACTUATED ELECTRICAL POWER SOURCE FOR A PHOTOGRAPHIC CAMERA OR A FLASHGUN ACCESSORY

[75] Inventors: William E. Shoupp, Pittsburgh; Walter V. Bratkowski, McKeesport, both of Pa.

[73] Assignee: Westinghouse Electric Corporation, Pittsburgh, Pa.

[22] Filed: Feb. 27, 1970

[21] Appl. No.: 15,139

[52] U.S. Cl. ............................................. 95/11.5 R
[51] Int. Cl. ............................................. G03b 15/03
[58] Field of Search ......... 95/11.5 R, 11.5 A; 310/12, 310/13, 14, 15

[56] References Cited

UNITED STATES PATENTS

| R22,433 | 2/1944 | Mendelsohn et al. | 95/11.5 |
|---|---|---|---|
| 3,353,467 | 11/1967 | Ernisse et al. | 95/11.5 |
| 2,382,981 | 8/1945 | Edgerton | 310/15 X |
| 2,730,937 | 1/1956 | Martin et al. | 95/11.5 |
| 3,156,857 | 11/1964 | Herr et al. | 310/15 X |
| 3,448,304 | 6/1969 | Marti | 310/15 |
| 2,409,967 | 10/1946 | Weisglass | 95/11.5 UX |

Primary Examiner—Samuel S. Matthews
Assistant Examiner—Michael L. Gellner
Attorney—A. T. Stratton, W. D. Palmer and D. S. Buleza

[57] ABSTRACT

The energy required to operate an electrical device, such as a photoflash lamp, associated with a camera is produced by a mechanically actuated electrical generator which constitutes an integral part of the camera and thus eliminates the need for batteries. The generator is spring-driven and comprises a stationary permanent magnet and a flat coil of insulated copper wire that is rapidly propelled a short distance along a path such that the coil cuts the magnetic lines of flux in the gap between the pole pieces of the magnet and produces a voltage pulse of sufficient magnitude to energize the photoflash lamp or other device. The generator is automatically primed for use when the shutter is cocked (or the film is advanced) and is then automatically actuated when the shutter-release mechanism is tripped. In the case of a photoflash lamp, the generated voltage pulse is so synchronized relative to the movement of the shutter that the fired lamp reaches peak light output while the shutter is in its aperture-open position. The wire coil is fastened to the camera shutter or a separate swingable member. Alternatively, the coil is wound in tubular form and is stationary and the magnet is moved relative to the coil. A flashgun having an integral manually operated electrical generator which charges a condenser that is discharged through a circuit controlled by the shutter-release mechanism and ignites a flashlamp in synchronism with the operation of the shutter is also disclosed.

15 Claims, 13 Drawing Figures

PATENTED JAN 9 1973 3,709,118

INVENTORS
William E. Shoupp
Walter V. Bratkowski
BY D. S. Bulga
AGENT

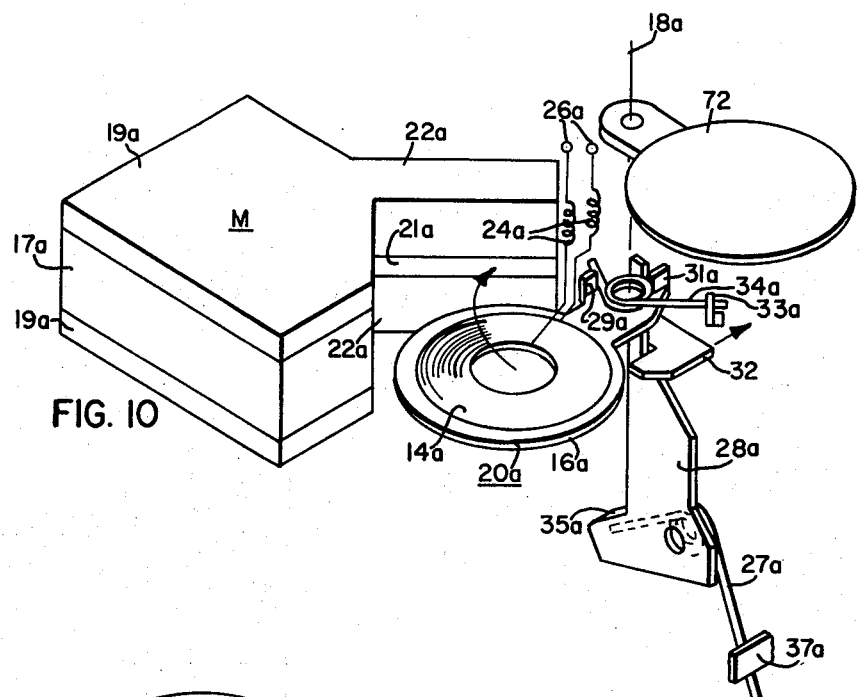
FIG. 10
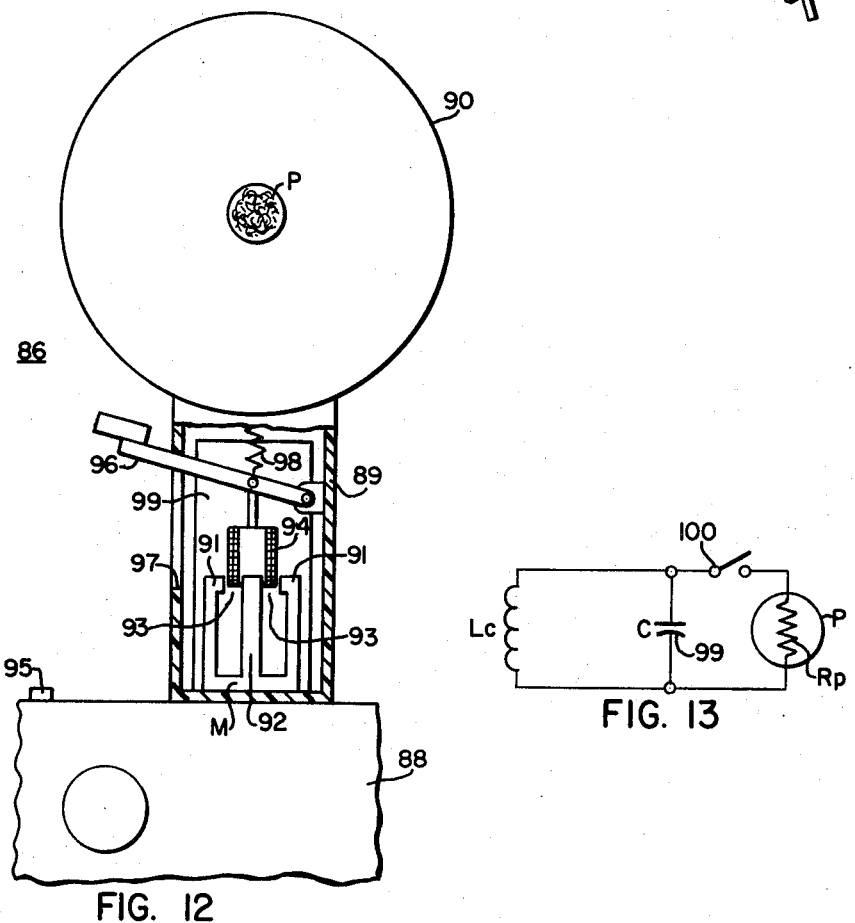
FIG. 12
FIG. 13

INTEGRAL MECHANICALLY ACTUATED ELECTRICAL POWER SOURCE FOR A PHOTOGRAPHIC CAMERA OR A FLASHGUN ACCESSORY

BACKGROUND OF THE INVENTION

1. Field of the Invention

This invention relates to photographic apparatus and has particular reference to a camera having an inexpensive and practical means for mechanically generating a sufficient amount of electrical energy to operate a device such as a photoflash lamp or the like associated with the camera.

2. Description of the Prior Art

Recent advances in the industry have greatly simplified photographic cameras and rendered picture-taking almost entirely automatic. However, one of the persistent problems encountered in taking flash pictures with even the most sophisticated cameras arises when the batteries in the camera or flashgun are too weak to ignite the flashlamp. This is not only aggravating since a desired picture may be missed but, with some types of cameras, wastes expensive film since the roll of film must be indexed to the next position in order to recock the shutter. The electrical characteristics of the dry cell batteries generally employed in cameras are such that a poor connection or high-resistance junction between the battery terminals and contactor members in the camera frequently prevent even fresh batteries from supplying sufficient current to fire the photoflash lamp. The photographer is thus forced to periodically check on the state of the batteries and such electrical connections in order to keep them in operative condition.

As a solution to the foregoing problems and aggravations associated with using batteries as the power source in cameras and flashguns for igniting flashlamps, it has been proposed that a mechanically actuated electrical generator be used in place of the batteries. The electrical generators previously proposed or developed are of various types and employ different arrangements for actuating the generator. In one prior art design, a permanent magnet is attached to a flap-type shutter and enters a stationary wire coil when the shutter is opened, thus generating a voltage which "fires" a thyratron tube in an external electrical circuit that flashes a gaseous discharge type light source. A camera and a high voltage lamp-energizing circuit of this type is described in U.S. Pat. No. 2,538,577 issued Jan. 16, 1951 to C. W. McCarty. A more recent proposal employs an electrical generator consisting of a pair of stationary windings disposed around a permanent magnet that is spun by means of a gear which is coupled to a rotatable geared ring that also operates the camera shutter through a separate gear arrangement. The ring is rotated by a spring which is loaded when the shutter is cocked so that the motion of the ring drives both the shutter and the magnet component of the electrical generator when the shutter is tripped. A camera shutter and generator assembly of this type is disclosed in Japanese Pat. Publication No. 39–22075 published Oct. 7, 1964.

Other prior art designs in which a magnet having a pivoted elongated armature is mounted within a flashgun and the armature is shifted relative to a wire coil by a manually operated linkage arrangement or by a leaf spring to shift the path of the magnetic field and thereby produce electrical energy are disclosed in U.S. Pat. Nos. 2,490,225, issued Dec. 6, 1949 to P. K. McGall, and 2,448,897 issued Sept. 7, 1948 to S. D. Livingston, respectively. Flashguns having "built-in" electrical generators in which a permanent magnet is rotated within stationary coil windings by various types of gear or ratchet systems driven by springs are also well known in the art. Flashguns constructed in this manner are described in U.S. Pat. Nos. 2,299,497 and 2,322,067.

While the prior art electrical generators achieve the desired objective of eliminating the batteries in the camera or flashgun, they require precision gears or intricate linkage systems and finely balanced rotating components and are thus too expensive and complicated for use in cameras made on a mass-production basis. In addition, the prior art assemblies are quite bulky and will not fit inside the compact cameras now being marketed.

SUMMARY OF THE INVENTION

The foregoing disadvantages and problems associated with the prior art electrical generators are solved in accordance with the present invention by placing a coil of fine insulated wire on the camera shutter and mounting a permanent magnet within the camera at a location such that the wire coil and shutter move as a unit into and out of the gap between the pole faces of the magnet when the spring-loaded shutter is tripped. Thus, the same set of springs which propels the shutter and returns it to its original aperture-closing position is used to drive the generator and the shutter serves both as an aperture-control component and as the armature of an integral electrical generator. The generator is, accordingly, compact, simple, reliable and inexpensive.

In another embodiment a separate armature is employed and is mounted on a common shaft in angularly offset relationship with the camera shutter in order to avoid any possible interference with the camera aperture or proper exposure of the film. This embodiment also permits greater flexibility in the design of the armature as regards the number of fine wire turns, the size and shape of the coil and magnet, etc. In each embodiment, however, the spring-loaded generator is coupled to and actuated by the shutter-release mechanism.

A flashgun having an integral electrical generator that is manually operated and charges a condenser in the flashgun is also disclosed.

BRIEF DESCRIPTION OF THE DRAWINGS

A better understanding of the invention will be obtained by referring to the exemplary embodiments shown in the accompanying drawings, in which:

FIG. 10 is a schematic perspective view of another embodiment of the invention;

FIG. 12 is a front elevational view, partly in section, of a flashgun that includes an integral manually operable electrical generator and is mounted on a camera; and FIG. 13 is a schematic diagram of the electrical circuit formed by the coupled camera and flashgun.

DESCRIPTION OF THE PREFERRED EMBODIMENT (FIGS. 1–4)

Figure 1:
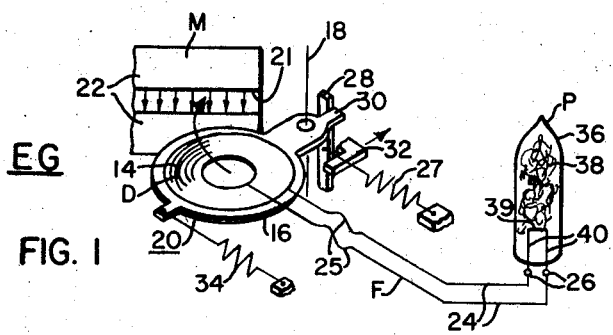
FIG. 1 is a schematic perspective view of an electrical generator and circuit means for a camera which automatically fires a flashlamp in accordance with the invention.

FIG. 1 is a schematic representation of one form of the invention illustrating the basic concepts involved. As shown, the integral electrical generator EG according to the present invention consists primarily of a permanent magnet M and a suitable electrical conductor means D that are rapidly moved relative to one another a limited distance along a predetermined path such that the conductor means D cuts the magnetic lines of flux of the magnetic circuit and produces a voltage pulse that is delivered by a circuit means F to an electrical device, such as a photoflash lamp P, associated with the camera. In this particular embodiment, the permanent magnet M is stationary and the electrical conductor means D comprises a flat circular coil 14 of fine insulated copper wire that is fastened to a flat generally circular support member 16 of non-magnetic material which is swingable about a predetermined axis 18. The coil 14 and support member 16 form a planar or blade-like armature 20 that is so oriented relative to the magnet M that the armature 20 enters the gap 21 defined by the pole pieces 22 of the magnet M and cuts across the magnetic lines of flux (indicated by the small arrows) when the armature 20 is swung about axis 18. The resulting voltage pulse is applied to the flashlamp P by circuit means F which, as shown, may consist of a pair of lead wires 24 that are connected to the coil 14 and have flexible segments 25 that permit the armature 20 to move freely.

The armature 20 is rapidly propelled in whip-like fashion into and out of the gap 21 by a mechanically loadable drive means which will now be described. A mainspring 27 is attached to a rotatable striker member 28 that is held in abutting relationship with a protruding tongue 30 on the support member 16 by a locking means such as a movable latch 32. The tongue 30 and circular body portion of the armature 20 are located on opposite sides of the axis 18 and the striker 28 is locked in the position shown (against the pull of the main spring 27) by the latch 32. Hence, when the latch 32 is released as indicated by the arrow in FIG. 1, the striker 28 applies a torque to the tongue 30 which propels the opposite end of the planar armature 20 edgewise into the gap 21. The wire coil 14 cuts the magnetic lines of flux in the gap and a pulse of electrical energy is induced in the coil 14, which energy is applied to the photoflash lamp P through the lead wires 24.

The armature 20 is restored to its original position by a return spring 34 that is coupled to a part of the support member 16 that is located opposite the tongue 30. Of course, the stiffness of the return spring 34 is much less than that of the main spring 27 and the spring constants are so correlated that the armature 20 swings into interacting relationship with the magnetic field in the gap 21 and returns to its starting position in a very rapid "whip-like" manner. The potential energy stored in the tensioned main spring 27 is thus rapidly converted into kinetic energy which drives the electrical generator EG.

As shown in FIG. 1, the lead wires 24 are connected to terminals 26 which engage the contacts of the electrical device associated with the camera. In the embodiment shown, the electrical device comprises a conventional photoflash lamp P having a protective envelope 36 that is filled with several atmospheres of oxygen and a suitable fuel 38 such as shredded zirconium foil. Ignition of the lamp P is achieved by passing current through a fine tungsten wire filament 39 that is coated with a suitable primer (not shown) and connected to a pair of lead-in wires 40 that are sealed through the end of the envelope 36. The outer ends of the wires 40 are connected to the terminals 26 of the electrical generator circuit means F.

Figure 2:
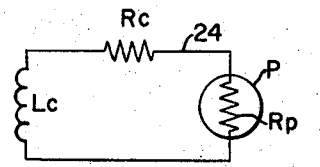
FIG. 2 is a schematic representation of the electrical circuit formed by the components of the device shown in FIG. 1.

As shown in the schematic diagram of FIG. 2, the resulting electrical circuit is a series circuit that consists of the inductive reactance $L_c$ and resistance $R_c$ of the coil 14 and the resistance $R_p$ of the photoflash lamp P. Of course, the voltage that is generated by the armature 20 as it is "whipped" into and out of the gap 21 will depend upon the number of wire turns in the coil 14, the area of the coil 14 and the time rate of change of the magnetic flux density. These factors are related as follows:

$$e = NA\,(d\beta)/(dt) \times 10^{-8} \text{ volts}$$

In the above equation, $e$ is the generated voltage, $N$ the number of turns in the coil cutting lines of flux at time $t$, $A$ the area in the gap swept by the coil at time $t$, and $d\beta/dt$ is the time rate of change of flux density at time $t$. The various components of the electrical generator EG are correlated in a manner such that the generated voltage pulse is sufficient to energize and reliably fire the photoflash lamp P or operate various other types of electrical devices associated with the camera.

Figure 4:
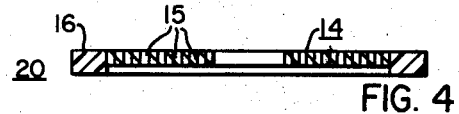
FIG. 4 is an enlarged cross-sectional view of the armature component of the generator taken along line IV—IV of FIG. 3.
Figure 3:
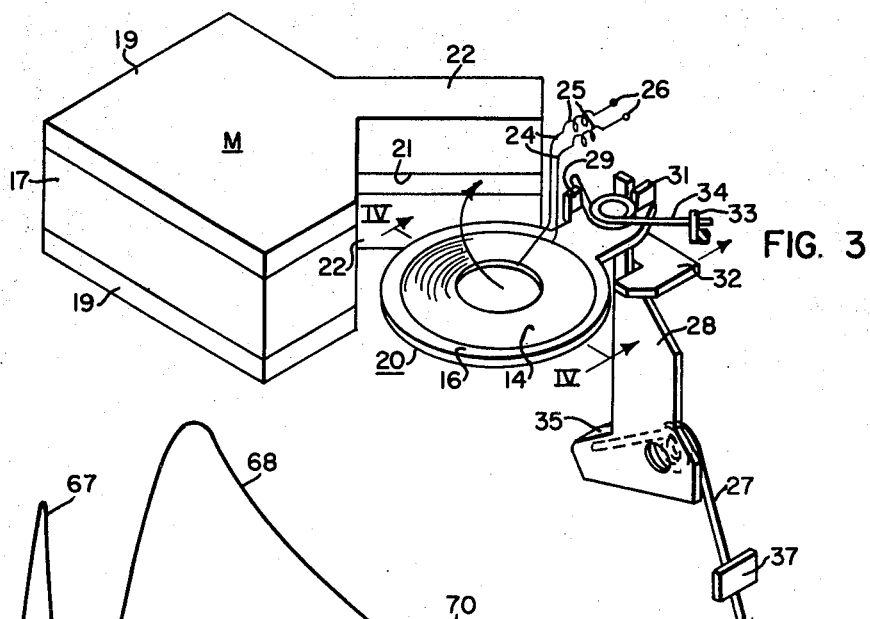
FIG. 3 is an enlarged perspective view of a prototype electrical generator for a camera which embodies the operating principles illustrated in FIG. 1.

FIGS. 3-4 Embodiment

A more sophisticated electrical generator is shown in FIG. 3 and employs a permanent magnet M that has a generally rectangular core 17 and overlying soft iron plates 19 that have protruding pole pieces 22 which define a planar gap 21 of accurate dimensions. A blade-like armature 20 of the same general type as that shown and described in connection with FIG. 1 is employed. However, the protruding segment of the planar support member 16 is provided with a tab 29 and the end of the segment is formed into an upstanding shoe 31 which seats against the end of the pivoted striker member 28. The return spring 34 is of the loop type and has one of its ends anchored by the tab 29 and its other end anchored by a cleat 33 that is secured to a stationary part of the camera. The main spring 27 is also of the loop type and is held in place by a tab 35 formed on the pivoted end of the striker 28 and by another cleat 37 secured to a stationary part of the camera. The striker 28 is cocked by rotating it against the force exerted by the main spring 34 until the tip of the striker slips behind the shoe 31 on the end of the armature 20 and the latch 32 slips into locking engagement with the striker. To actuate the generator the latch 32 is simply moved in the direction indicated by the arrow in FIG. 3. This releases the striker 28 and converts the mechanical energy stored in the main spring 27 into kinetic energy which whips the circular body portion of the armature 20, and thus the wire coil 14, into the gap 21 between the pole pieces 22 along a path that is normal to the lines of flux. The armature 20 is then quickly returned to its original position by the action of the then-tensioned return spring 34.

As shown in FIG. 4, the body portion of the support member 16 preferably comprises a ring of suitable non-magnetic material, such as aluminum or brass, and the flat wire coil 14 is located within the ring and secured to its inner rim by a suitable cement. The coil 14 is wound from a continuous piece of fine wire 15 composed of copper or the like that is coated with insulating material (not shown). As will be noted, the wire 15 is preferably rectangular in cross-section and is wound so that its long dimension is normal to the plane of the armature and the turns are tightly seated against each other. This provides a maximum number of turns in the coil 14 and minimizes its overall diameter, weight and electrical resistance. Of course, the overall thickness of the planar armature 20 is less than the spacing between the pole pieces 22 so that the armature will pass freely into and out of the gap 21 without touching the pole faces.

As shown in FIG. 3, the lead wires 24 are connected to the ends of the coil 14 and the latter are located adjacent the pivot axis of the armature 20 in order to reduce the flexing of the looped segments 25 of the leads and minimize drag on the armature.

Design Paramaters

Of prime importance in the design of the electrical generator of this invention is the selection of the main spring 27 insofar as the latter must supply a sufficient amount of kinetic energy to propel the armature 20 at the required speed through the magnetic field in addition to the energy expended as a result of the frictional losses of the system, the drag produced by the return spring 34, etc. The controlling factor is, of course, the electrical energy required to ignite the flashlamp P. The distribution of energies and the amount of energy which the main spring must supply can be calculated from the following equations:

$$U_s = U_L + U_a + U_i$$

$$U_s = \tfrac{1}{2} K_t \theta_o^2; \quad U_c = \int T d\Psi$$

$$U_i = \int e\, i\, dt$$

where;

$U_s$ is the energy derived from the main spring,
$U_L$ is the energy loss of the system,
$U_a$ is the energy required to move the armature into the gap,
$U_i$ is the energy required to ignite the photoflash lamp,
$K_t$ is the main spring constant,
$\theta_o$ is the angle of spring rotation,
$T$ is the torque accelerating the armature,
$\Psi$ is the angle of armature rotation at time $t$,
$e$ is the voltage across the photoflash lamp,
$i$ is the current through the lamp, and
$t$ is time.

With the above relationships as guidelines, prototype electrical generators have been constructed which will consistently fire photoflash lamps of the type used in flashcubes now being marketed.

Figure 5:
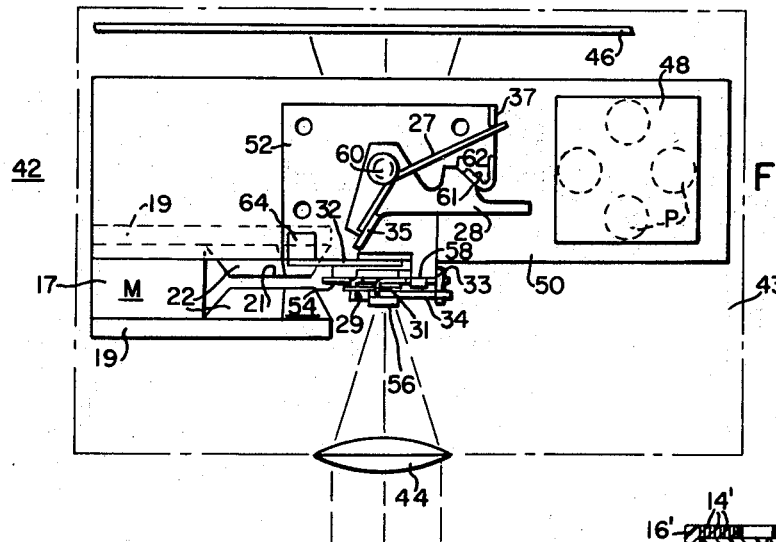
FIGS. 5 and 6 are schematic plan and front elevational views, respectively, of a photographic camera which includes an electrical generator similar to that shown in FIG. 3 and is provided with a flashcube containing four photoflash lamps.
Figure 7:
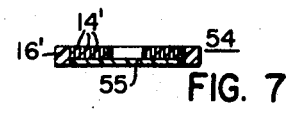
FIG. 7 is an enlarged cross-sectional view of the shutter-armature component of the generator taken along line VII—VII of FIG. 6.
Figure 6:
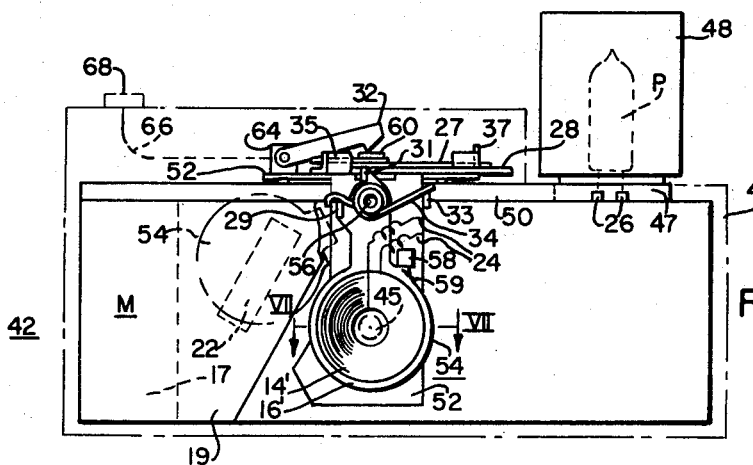

Camera Embodiment (FIGS. 5-7)

In FIGS. 5 and 6 there is shown a camera 42 that has an integral electrical generator of generally the same construction as that shown schematically in FIG. 3. The camera housing 43 is shown in phantom and is fitted with the usual lens 44 that is aligned with and positioned a predetermined distance in front of an aperture 45 (see FIG. 6) so that an image of the scene being photographed is projected onto a film 46 located in a compartment at the back of the housing. The camera 42 will, of course, include a view finder, means for mechanically indexing the film and cocking the shutter, etc. which are not shown in the drawing. A suitable socket 47 is mounted on top of the camera housing 43 to receive the base portion of an electric device, such as a flashcube 48 that contains four photoflash lamps P which are fired in sequence as the roll of film is indexed and the flashcube is rotated. Such flashcubes, camera sockets, and means for indexing the flashcube in unison with the film are well known in the art. In some cameras, such as the "Instamatic 124" camera marketed by the Eastman Kodak Co., the film indexing mechanism is coupled to both the flashcube socket and the shutter-cocking mechanism so that all three of these operations are effected by actuating a single lever. A suitable structure of the aforesaid type is disclosed in U.S. Pat. No. 3,353,467 issued Nov. 21, 1967 to P. J. Ernisse et al.

As will be noted more particularly in FIG. 5, the magnet M is held in fixed position within the housing 43 to one side of but adjacent the optical axis of the camera 42 by a plate 50 that extends across the top of the housing. The core 17 of the magnet M extends along one side of the housing 43 and the overlying soft iron plates 19 extend toward the optical axis of the camera and terminate in tapered pole pieces 22. The pole pieces 22 have flat rectangular faces that define a narrow planar gap 21.

The movable parts of the electrical generator are mounted on a second and smaller plate 52 that is attached to the main plate 50 and extends downwardly between the lens 44 and the film 46. As shown in FIG. 6, the downwardly depending portion of plate 52 is provided with a circular opening that is aligned with the camera lens 44 and comprises the aperture 45 of the camera 42.

In accordance with this embodiment, the blade-like armature 54 of the electrical generator also constitutes the shutter of the camera 42 and thus serves a dual purpose. As will be noted in FIG. 6, the shutter-armature 54 is of the same shape as the armature 20 of the FIGS. 3-4 embodiment. However, since it also functions as the shutter the central opening in the flat coil of wire must be closed off. As shown in FIG. 7, this can readily be accomplished by placing the flat coil 14' inside the ring portion of the support member 16' and then placing a circular insert 55 of opaque non-conductive sheet material, such as plastic or the like, over the coil and fastening it with a suitable cement to the surrounding portion of the support member. This provides a shutter-armature 54 that is opaque and of approximately the same mass as a conventional shutter of the same size.

As illustrated most clearly in FIG. 6, the shutter-armature 54 is pivotally mounted on the plate 52 by a pin 56 that passes through the looped portion of the return spring 34. The ends of the return spring 34 are anchored in place by a tab 29 coined from the support member 16' and by a cleat 33 secured to the support plate 52. The shutter-armature 54 is normally positioned in front of the aperture 45 and is kept in such position by a raised stop 58 on the plate 52 which is engaged by a shoulder 59 formed on the periphery of support member 16'.

The ends of the flexible lead wires 24 attached to the coil 14' are connected to a circuit (not shown) within the camera 42 which, in turn, is connected to a pair of exposed terminals 26 associated with a socket 47 located on top of the camera. The lamps P of a flashcube 48 placed in the socket 47 are connected to the terminals 26 in the usual manner as the flashcube is indexed.

As shown more particularly in FIG. 5, the striker 28 is pivotally attached to the plate 52 by a pin 60 which passes through the looped portion of the main spring 27. One end of the main spring 27 is seated against a tab 35 provided on the end of the striker 28 and the other end of this spring is seated against a cleat 37 that comprises a part of the support plate 52. The striker 28 is shown in uncocked position in FIGS. 5 and 6 and is maintained in predetermined relationship with the shutter-armature 54 by a stop 61 on the plate 52 that engages a shoulder 62 on the shank portion of the striker.

Since the blade-like member 54 constitutes both the shutter and the armature in this embodiment, the electrical generator is primed for use by the same mechanism which cocks the shutter of the camera 42. Insofar as such shutter-cocking mechanisms are well known in the art and a suitable arrangement is disclosed in the aforesaid Ernisse et al. patent, it need not be shown or described. In the case of "Instamatic" type cameras marketed by Eastman Kodak Co., the shutter is cocked and indexing of the cartridged roll of film are both achieved by actuating a single lever at the back of the camera. If camera 42 were of this type, then the electrical generator would also be primed for use by the aforesaid lever.

When the shutter-cocking mechanism of camera 42 is actuated, whether by a separate mechanism or in conjunction with a film-indexing mechanism, striker 28 is swung against the action of the main spring 27 until the tip of the striker slips behind the shoe 31 on the end of the shutter-armature 54. The latch 32 is then urged by the cocking mechanism into locking engagement with the striker 28 — thus completing the cocking operation.

As shown in FIG. 6, latch 32 is pivotally attached to a block 64 secured to the support plate 52 and is coupled to and controlled by a suitable shutter-release mechanism 66 that is actuated by a button 68 provided on a conveniently accessible part of the camera 42. When the shutter-release mechanism 66 is actuated by pressing button 68, latch 32 is disengaged and frees the striker 28 which whips the shutter-armature 54 into the gap 21 between the pole pieces 22 until the shutter-armature is centrally located with respect to the pole faces, as indicated by the phantom outline of the shutter-armature 54 shown in FIG. 6. The shutter-armature is then immediately returned to its original aperture-closing position by the action of the return spring 34 and the electrical generator is in condition for reactivation. As will be obvious from the spacing between the aperture 45 and the gap 21, the opening of the aperture 45 commences just as the shutter-armature 54 enters the gap 21 and the aperture remains open for a predetermined period of time.

Thus, by simply pressing button 68 and actuating the shutter-release mechanism 66, both the shutter and the electrical generator are tripped and automatically operate in a predetermined sequence such that the aperture 45 is open for a prescribed length of time and a voltage pulse is generated and applied to the connected photoflash lamp P in synchronism with the movement of the shutter-armature 54. The timing is such that the fired lamp P reaches peak light output while the aperture 45 is open.

Figure 8:
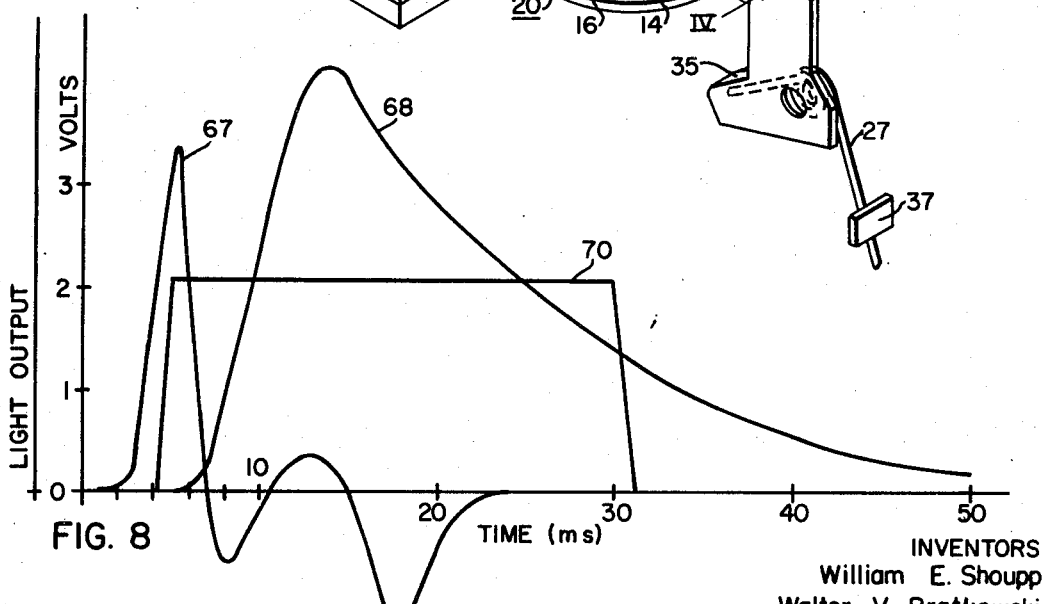
FIG. 8 is a composite graph illustrating the time-sequence relationship between the voltage pulse produced by the electrical generator, the light output of the fired flashlamp and the opening of the camera aperture by the shutter-armature of the generator shown in FIGS. 5 and 6.

Synchronism of Flash and Opening of Aperture (FIG. 8)

The aforementioned sequence is shown graphically in FIG. 8 which depicts the time-relationships of the generated voltage pulse, the firing of the flashlamp and opening of the camera aperture. The voltage is shown by curve 67 and peaks at about 3 milliseconds after the edge of the shutter-armature 54 enters the gap 21 and begins to generate a voltage. When peak voltage is reached the filament of the photoflash lamp P is heated sufficiently to fire the lamp. As shown by curve 68, the light output increases rapidly and peaks about 8 or 9 milliseconds later, and then gradually decreases at a fairly uniform rate. The light output drops to 50 percent about 20 milliseconds after ignition occurs.

As shown by curve 70, the shutter-armature 54 begins to open the camera aperture 45 about 2 milliseconds after the voltage generation begins and completely opens it 1 millisecond later just as the voltage reaches its maximum value. The aperture remains open for about 25 milliseconds (equivalent to a shutter speed of one-fortieth of a second) and is completely closed approximately 1 millisecond later. It will thus be apparent that the operation of the electrical generator is so synchronized with the opening of the camera aperture 45 and the electrical and flashing characteristics of the photoflash lamp P that the fired lamp reaches maximum light output and emits the major portion of its radiation while the aperture 45 is completely open. Hence, proper exposure of the film is insured.

The light output curve 68 shown in FIG. 8 is that of an AG ½ type photoflash lamp used in flashcubes, and curve 70 depicting the operation of the shutter is that of an "Instamatic 124" camera. AG ½ type photoflash lamps are roughly one half the size of AG 1 flashlamps known in the art. The voltage-pulse curve 67 was obtained from an electrical generator of the type shown in FIGS. 5 and 6 which had a shutter-armature member 54 of the same mass as the shutter of an "Instamatic 124" camera.

SPECIFIC EXAMPLE

As a specific example of the various parameters and dimensions of the generator components, voltage pulses which peaked at 4 and 4½ volts (open circuit) have been obtained by using a magnet composed of "Westro Alpha" ceramic permanent magnetic material (a product of the Westinghouse Electric Corporation) that provided a total of 13.5 kilogauss in a gap defined by soft iron pole pieces which were spaced 0.762 millimeters apart. The pole faces were rectangular and were 6.45 mm. wide and 19.05 mm. long. The pole pieces and plates were made from cold rolled steel (preferably SAE 1010) that was given a magnetic anneal. The coil was wound from insulated copper wire of rectangular cross-section (0.318 mm. × 0.089 mm.) and contained a total of 50 turns. The diameter of the coil was 19.05 millimeters and the circular body portion of the support member in which the coil was mounted had a diameter of 20.6 millimeters and a thickness of 0.48 millimeters. The support member was fabricated from non-magnetic stainless steel. The main spring had a tension of 12 ounces. While a ceramic permanent magnet was used, other well known magnetic materials such as "Alnico 5" alloy or similar metallic alloys can be employed.

As will be obvious to those skilled in the art, all of the camera components in contact with or in the vicinity of the magnet M should be manufactured from non-magnetic material in order to prevent them from becoming magnetized and interfering with the operation of the camera or electrical generator.

Figure 9:
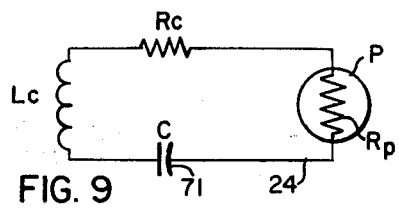
FIG. 9 is a schematic diagram of an alternative electrical circuit which modifies the shape of the voltage pulse produced by the electrical generators.

Alternative Circuit Embodiment (FIG. 9)

In FIG. 9 there is shown an improved electrical circuit for use in conjunction with the electrical generator of this invention which will increase the magnitude of the generated voltage pulse. As shown, a condenser 71 is inserted into the circuit in series with the photoflash lamp P and the wire coil so that the circuit consists of the resistance $R_c$ and inductive reactance $L_c$ of the coil, the capacitive reactance C of the condenser, and the resistance $R_p$ of the lamp. The capacitance is such that the two reactances nullify one another. Thus, the magnitude of the generated voltage is governed solely by the resistance $R_c$ of the coil 14' and the resistance $R_p$ of the photoflash lamp P and will be proportionally increased. This will provide additional assurance that sufficient voltage will be applied to the photoflash lamp P to fire it.

Alternative Generator-Shutter Assembly (FIG. 10)

In FIG. 10 there is shown another form of electrical generator and shutter assembly according to the present invention. In this embodiment the shutter and armature components comprise separate elements but are cocked and actuated by the same spring and release mechanism. As will be apparent, the electrical generator per se is identical to the one illustrated in FIG. 3 and a description of its construction and operation thus need not and will not be repeated. The various components are identified by the same reference numerals as those used in FIG. 3 and the subscript a is used to indicate that an alternative shutter-generator assembly is involved.

In contrast, to the electrical generator shown in FIGS. 5–7 in which the armature also serves as the shutter, in the embodiment depicted in FIG. 10 the shutter 72 comprises a separate blade-like member which is generally of the same shape and size as the armature 20a but is longitudinally and angularly offset from the armature. This is achieved by fastening the shutter 72 and armature 20a to a common shaft (not shown) so that they swing as a unit about the same axis 18a. Thus, the springs 27a and 34a which whip the armature 20a into and out of the gap 21a also actuate the shutter 72 and return it to its original aperture-closing position. The striker 28a and latch 32a are coupled by suitable linkage means (not shown) to the shutter-cocking and shutter-release mechanisms so that shutter 72 and armature 20a are primed for use and actuated simultaneously. The angular displacement of the armature 20a and the shutter 72 is such that the generation of the voltage pulse and resultant firing of the flashlamp P are precisely synchronized with the opening of the aperture. This arrangement affords the additional advantage of physically separating the electrical generator from the shutter-aperture assembly — thus simplifying the design of the camera and facilitating the physical placement of the various components within the camera housing.

Figure 11:
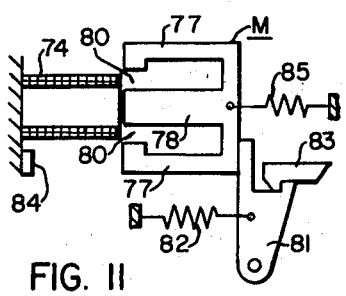
FIG. 11 is a schematic representation of still another embodiment.

Alternative Generator Embodiment (FIG. 11)

In FIG. 11 there is shown another form of electrical generator wherein the desired voltage pulse is generated by a stationary coil 74 of fine insulated wire and a movable permanent magnet M. The coil 74 is wound in the form of a cylindrical tube and is mounted in fixed position within the camera in alignment with a movable permanent magnet M that has two end pole pieces 77 and a central pole piece 78. The pole pieces are elongated, disposed parallel to each other and define a pair of laterally spaced gaps 80 of such dimensions that diametrically disposed portions of the tubular coil 74 will pass freely through the gaps and the center pole piece 78 will enter the coil when the magnet M is actuated.

The magnet M is propelled into interacting telescoped relationship with the coil 74 by a pivoted striker 81 that is seated against the end of the magnet and is locked in such position against the action of a helical main spring 82 by a latch 83 which engages a tooth on the shank portion of the striker 81. The latch 83 is coupled to the shutter-release mechanism (not shown) by suitable linkage means so that when the shutter is tripped the latch 83 is actuated and the magnet M is propelled into the coil 74, thus generating a voltage pulse that is delivered to the photoflash lamp P or other electrical device through the circuit means (not shown) connected to the coil winding.

A resilient stop 84 may be provided adjacent the coil 74 to cushion the impact of the moving magnet M and avoid jarring the camera during the picture-taking operation. A return spring 85 can also be attached to the magnetic M to return it to its original spaced-apart relationship relative to the coil 74. As in the previous embodiments, the striker 81 and latch 83 are coupled to the shutter-cocking or film-indexing mechanism of the camera which thus automatically primes the generator for use. Suitable cocking and indexing mechanisms are described in the aforementioned Ernisse et al. U.S. Pat. No. 3,353,467.

This embodiment affords the advantage of permitting a large number of turns to be used in the wire coil 74 so that voltage pulses having high peak values can be obtained with a relatively small magnet.

Flash-Gun Accessory (FIGS. 12–13)

In FIG. 12 the concept of a mechanically actuable electrical generator is embodied in a flashgun 86 that is adapted to be mounted on a conventional camera 88. As shown, the flashgun 86 comprises a hollow cylindrical housing 89 that is fitted with a reflector 90 which has socket means (not shown) for releasably holding a photoflash lamp P. A permanent magnet M having two end pole pieces 91 and a spaced center pole piece 92 is rigidly fastened to the bottom of the housing 89 and oriented so that the center pole piece 92 is in line with a tubular wire coil 94 attached to an actuating lever 96. The lever 96 is pivotally connected to the wall of the housing 89 and protrudes through a slot 97 provided in the housing. The tubular coil 94 is so dimensioned that it freely passes through the laterally spaced gaps 93 defined by the pole pieces 91, 92 and over the center pole piece 92 when the actuating lever 96 is pushed downwardly and the magnet M is propelled toward the coil. A return spring 98 can, if desired, be attached to the housing 89 and the actuating lever 96 to automatically return the lever and coil to their original positions. A condenser 99 is also mounted within the housing 89 and is electrically connected by conductors (not shown) to the ends of the wire coil 94. The number of turns in the coil 94 and the strength of the permanent magnet M are such that an electrical potential of sufficient magnitude to flash the photoflash lamp P is generated when the lever 96 is rapidly pushed downwardly. The generated pulse of electrical energy is stored in the condenser 99. The return spring 98, if used, has a spring constant such that it slowly returns the lever 96 and coil 94 to their starting position. Practically all of the generated electrical energy accordingly remains stored in the condenser 99.

The electrical circuit formed when the flashgun 86 is coupled with the camera 88 is shown schematically in FIG. 13. As will be noted, the generated electrical potential stored in the condenser 99 is delivered to and fires the photoflash lamp P when a switch 100 within the camera 88 is closed in the usual fashion by pressing the shutter-release button 95 on the camera (see FIG. 12). The inductive reactance $L_c$ of the coil 94 is of such magnitude compared to the resistance $R_p$ of the photoflash lamp P that practically all of the current flows through the lamp. Electrical coupling of the flashgun 86 and camera 88 is achieved in the usual fashion through terminals on the camera that are engaged by exterior connectors on the flashgun. This coupling can be effected by a cable or through a shoe on the camera which releasably holds the flashgun 86 in place on the camera.

It will be appreciated from the foregoing that a very simple and practical electrical generator has been provided which enables a photoflash lamp or other electrical device associated with a camera to be operated without the aid of batteries. The uncertainties as to the condition and reliability of the batteries and the aggravation of missing a picture and wasting film because of weak or dead batteries are accordingly eliminated. Cameras provided with the improved mechanically-powered electrical generator of this invention are compact, reliable, inexpensive, and automated to a degree that they are practically "fool-proof."

We claim as our invention:

1. In combination with a photographic camera having a shutter that is controlled by a shutter-release mechanism, means for energizing and operating an electrical device associated with said camera comprising;
   a. an electrical generator comprising a permanent magnet having a pair of spaced pole pieces, electrical conductor means shaped and dimensioned to fit freely within and pass through the gap separating said pole pieces, and means holding said permanent magnet and electrical conductor means in spaced apart relationship and operable to permit relative movement therebetween a limited distance along a path that extends between and beyond said pole pieces and thus causes said electrical conductor means to traverse and cut magnetic lines of flux in said gap, without touching said pole pieces,
   b. means for controllably storing mechanical energy and, in response to the actuation of said shutter-release mechanism, for converting stored mechanical energy into kinetic energy which actuates the electrical generator and rapidly moves the permanent magnet and electrical conductor means relative to one another along said path and thereby produces a voltage pulse in said electrical conductor means, and
   c. circuit means connected to said electrical conductor means for delivering the generated voltage pulse to a device associated with the camera.

2. The combination of claim 1 wherein;
   said mechanical-energy storage means comprises a mechanically loadable resilient component that is retained in loaded position by a latch means, and said shutter-release mechanism is coupled to and actuates said latch means.

3. The combination of claim 1 wherein;
said electrical conductor means comprises a coil of insulated wire, and
said circuit means includes a capacitor that is connected in series with said wire coil and has a capacitive reactance which reduces the inductive reactance of the coil and thereby increases the magnitude of the voltage pulse produced by the electrical generator.

4. The combination of claim 1 wherein;
said shutter when actuated opens and closes the camera aperture in a prescribed time-sequence,
the device associated with the camera comprises a photoflash lamp,
said camera includes socket means for releasably holding a photoflash lamp and connecting said lamp to said circuit means, and
said mechanical-energy storage means actuates the electrical generator at a time that is so correlated with the movement of the released shutter that the resultant voltage pulse ignites a photoflash lamp in said socket means at a predetermined time relative to the opening of the aperture by the shutter.

5. The combination of claim 4 wherein;
said mechanical-energy storage means comprises a spring, and
said spring, electrical generator and circuit means comprise integral parts of the camera.

6. The combination of claim 5 wherein;
said electrical conductor means comprises a tubular coil of insulated fine wire that is mounted in upstanding fixed position within the camera remote from the aperture and optical axis thereof,
said permanent magnet is movably mounted within the camera and disposed so that said tubular coil passes freely through the gap between the pole pieces when the magnet is moved along said path, and
said spring is attached to a stationary part of the camera and to a pivoted striker member that is seated against the magnet and is pulled toward the tubular winding by the spring, and
said striker member and attached spring are retained in loaded condition by said latch means.

7. The combination of claim 6 wherein;
said permanent magnet has three elongated pole pieces that are substantially parallel to one another and define a pair of laterally-spaced gaps that are aligned with diametrically disposed wall portions of the tubular coil,
a second spring is attached to said permanent magnet and to a stationary part of the camera and coacts with the other spring in a manner such that the permanent magnet is (a) normally spaced from said tubular coil, (b) propelled into said coil when the latch means is tripped by the shutter-release mechanism, and (c) returned to its original position when the striker member and attached spring are again placed in loaded condition.

8. The combination of claim 5 wherein;
said permanent magnet is mounted in fixed position within the camera,
said electrical conductor means comprises a substantially planar coil of insulated fine wire that is swingable about an axis that is so oriented relative to the magnet that the coil is propelled edgewise in the gap between the pole pieces along a path that is substantially normal to the magnetic lines of flux in said gap, and
said circuit means includes flexible lead wires that are connected to said planar coil and are movable therewith.

9. The combination of claim 8 wherein;
said fine-wire coil is secured to a planar support of non-magnetic material and together therewith constitutes a swingable blade-like armature, and
said armature is coupled to a return spring which is so oriented and of such stiffness relative to the other spring that the armature is propelled out of and then back into the gap between the pole pieces in a rapid whip-like motion when the shutter-release mechanism is actuated.

10. The combination of claim 8 wherein;
said fine-wire coil is secured to a planar support member of non-magnetic material and together therewith constitutes a swingable blade-like armature, and
said armature is coupled to a return spring which is so oriented and of such stiffness relative to the other spring that the armature is propelled into and then out of the gap between the pole pieces in a rapid whip-like motion when the shutter-release mechanism is actuated.

11. The combination of claim 10 wherein;
the shutter also comprises a blade-like member,
said armature and shutter are fastened to a common shaft and are positioned in longitudinally spaced and angularly offset relationship with respect to one another, and
said shaft is rotated through a prescribed angle by said springs and the shutter and armature are thus simultaneously triggered as a unit by the shutter-release mechanism.

12. The combination of claim 10 wherein;
said armature comprises the camera shutter,
said pole pieces are located adjacent the aperture, and
the shutter-armature is retained in aperture-closing position by the return spring.

13. The combination of claim 12 wherein;
the spacing between the camera aperture and pole pieces, the relative stiffness of said springs, and the velocity of the released shutter-armature are such that the generated voltage pulse is applied to a connected photoflash lamp at a time such that the ignited lamp reaches peak light output while the shutter-armature is in aperture-open position.

14. In a flashgun adapted for use with a photographic camera having a shutter-release mechanism, means for releasably coupling the flashgun to the camera, and terminal means for electrically connecting the flashgun to a switch within the camera that is controlled by the shutter-release mechanism, the combination comprising;
a housing,
an electrical generator within said housing comprising a permanent magnet having a pair of spaced pole pieces, electrical conductor means shaped and dimensioned to fit freely within and pass through the gap separating said pole pieces, and means holding said permanent magnet and electrical conductor means in spaced apart relationship and operable to permit relative movement therebetween a limited distance along a path such that said electrical conductor means cuts the magnetic lines of flux in said gap without touching said pole pieces, means secured to said housing for actuating said electrical generator and thereby producing a voltage pulse in said electrical conductor means, a capacitor within said housing and connected to said electrical conductor means for storing the electrical energy produced by the electrical generator, a reflector fastened to said housing, socket means mounted on the reflector for releasably holding a photoflash lamp, a pair of contactors in said socket means for engaging the contacts of a photoflash lamp placed in said socket means, and circuit means within said housing connecting one side of said capacitor to one of the socket contactors and the other side of said capacitor to exterior connector means adapted to engage the terminal means on the camera and connect said other side of the capacitor to the other of said socket contactors through the switch in the camera when the flashgun is coupled to the camera and the shutter-release mechanism is actuated.

15. The combination of claim 14 wherein;

said permanent magnet is mounted in fixed position within said housing and has three elongated pole pieces that are disposed in parallel-spaced relationship and define a pair of laterally spaced gaps, said electrical conductor means comprises a tubular coil of insulated fine wire dimensioned to pass freely over the central pole piece of the magnet through said gaps, said tubular coil is coupled to an actuating lever that is pivotally fastened to said housing and extends therebeyond through an opening in the housing, and said actuating lever is coupled to a return spring that is anchored to the housing and has a spring factor such that it maintains the tubular coil in withdrawn position relative to the pole pieces and, after the actuating lever is operated, returns the tubular coil to such withdrawn position at a speed which does not materially decrease the stored electrical energy in said capacitor.

* * * * *